Figure 1:
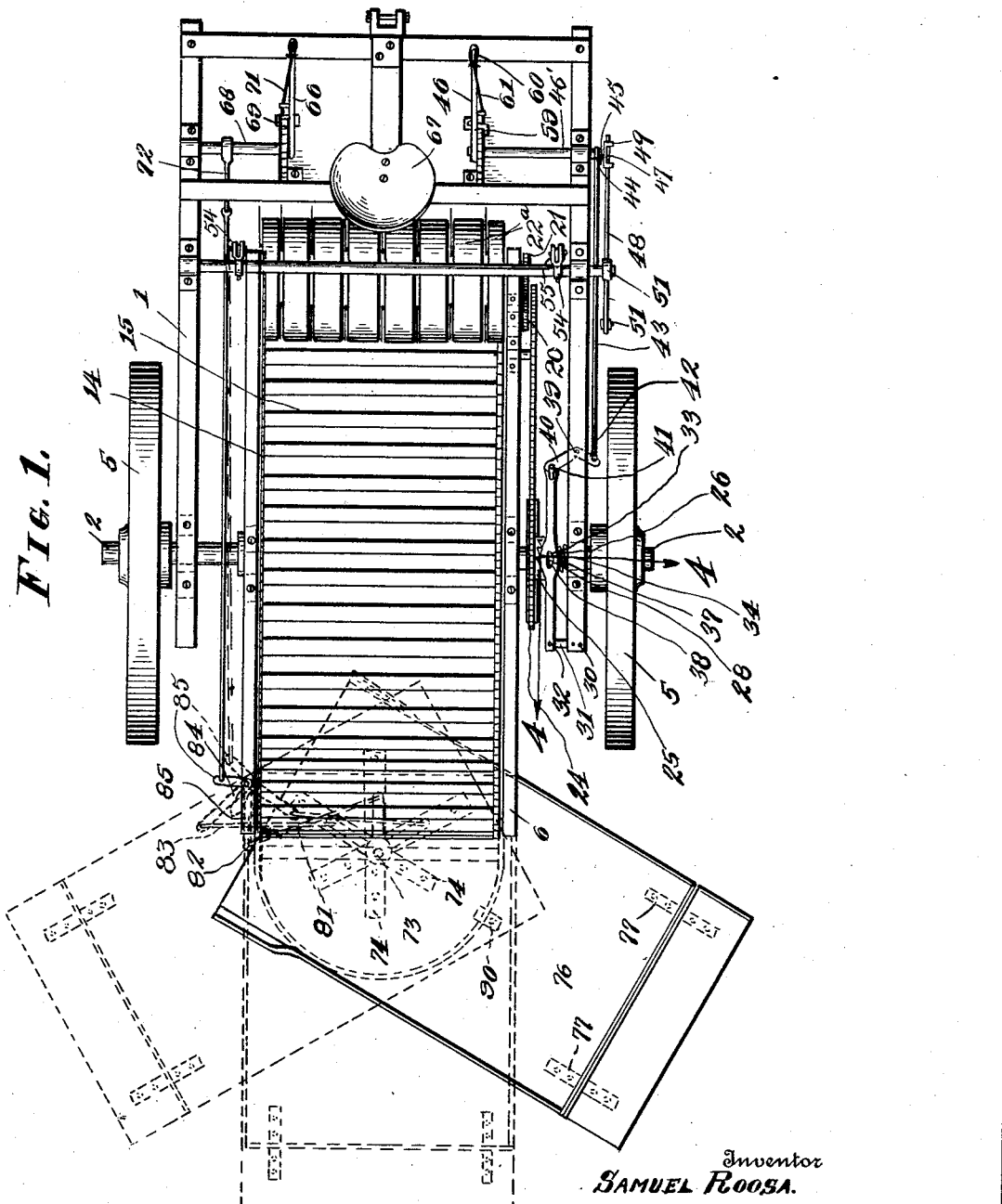

S. ROOSA.
HARVESTER FOR PEAS, BEANS, OR THE LIKE.
APPLICATION FILED JUNE 12, 1913.

1,120,977.

Patented Dec. 15, 1914.

Inventor
SAMUEL ROOSA.

By D. Swift &C.
Attorneys

Witnesses
Robt Meyer
Mark DeGrange

S. ROOSA.
HARVESTER FOR PEAS, BEANS, OR THE LIKE.
APPLICATION FILED JUNE 12, 1913.

1,120,977.

Patented Dec. 15, 1914.

4 SHEETS—SHEET 3.

Inventor
SAMUEL ROOSA.

Witnesses

By D. Swift &C.
Attorneys

S. ROOSA.
HARVESTER FOR PEAS, BEANS, OR THE LIKE.
APPLICATION FILED JUNE 12, 1913.
1,120,977.
Patented Dec. 15, 1914.
4 SHEETS—SHEET 4.
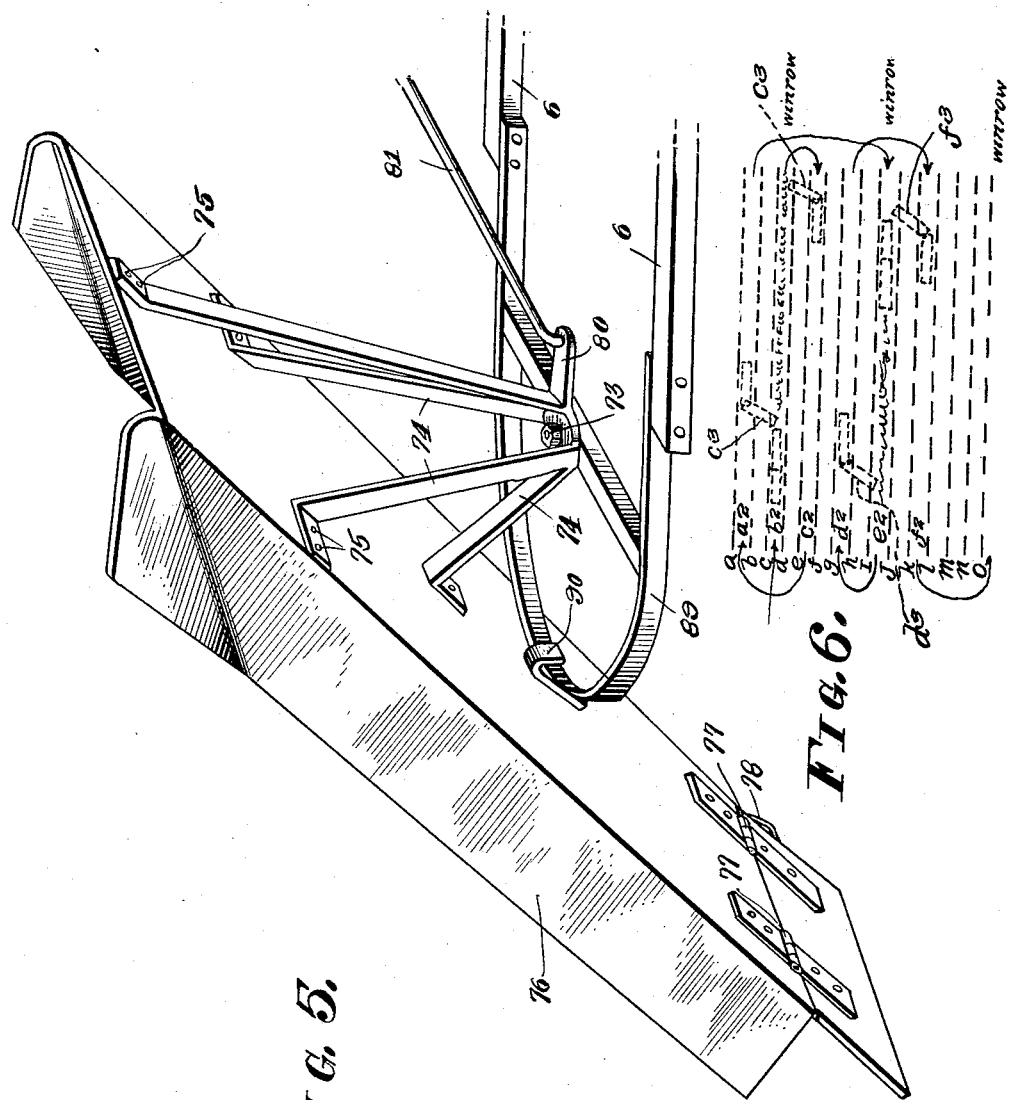
Witnesses
Inventor
SAMUEL ROOSA.
By D. Swift &C.
Attorneys

UNITED STATES PATENT OFFICE.

SAMUEL ROOSA, OF OWOSSO, MICHIGAN.

HARVESTER FOR PEAS, BEANS, OR THE LIKE.

1,120,977.   Specification of Letters Patent.   Patented Dec. 15, 1914.

Application filed June 12, 1913. Serial No. 773,297.

*To all whom it may concern:*

Be it known that I, SAMUEL ROOSA, a citizen of the United States, residing at Owosso, in the county of Shiawassee and State of Michigan, have invented a new and useful Harvester for Peas, Beans, or the like; and I do hereby declare the following to be a full, clear, and exact description of the invention, such as will enable others skilled in the art to which it appertains to make and use the same.

This invention relates to a new and useful improved harvesting machine for gathering beans, peas or the like.

The invention comprises further features and combination of parts, as hereinafter set forth, shown in the drawings and claimed.

Figure 2:
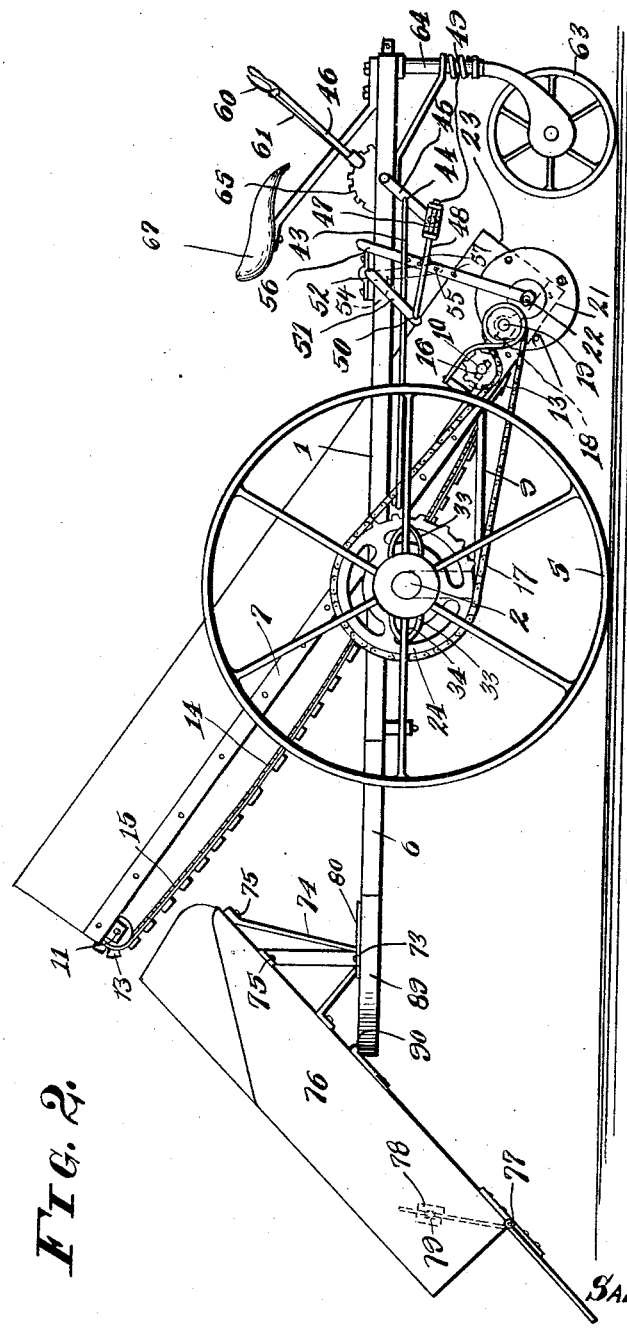
Figure 3:
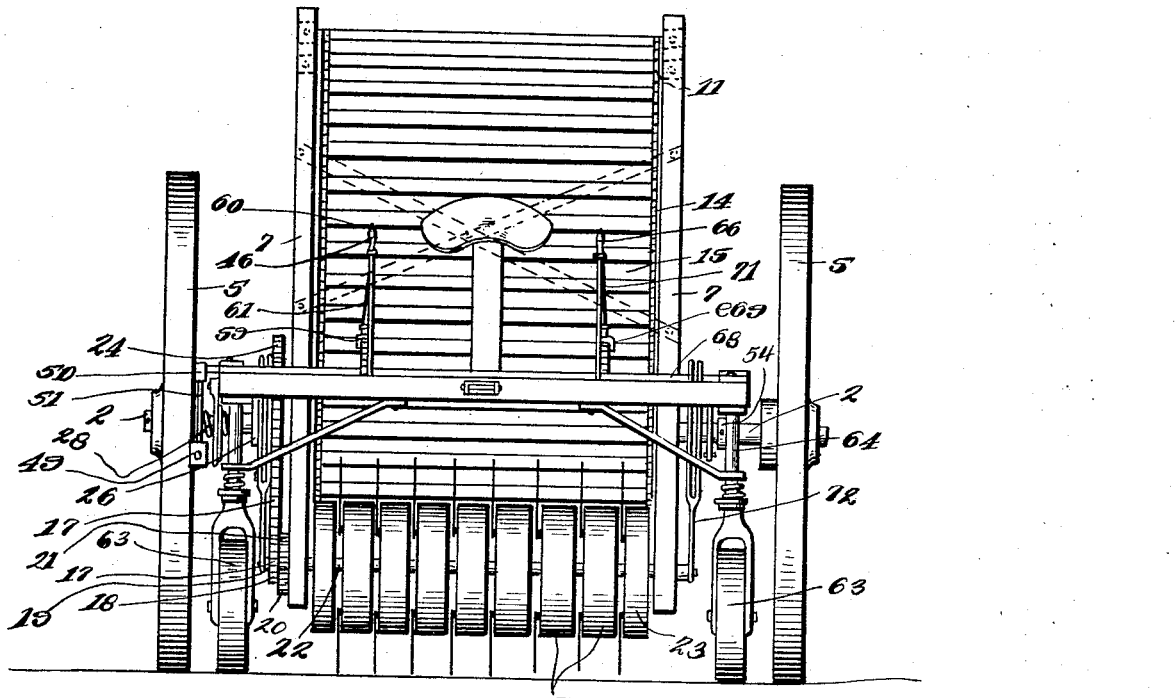
Figure 4:
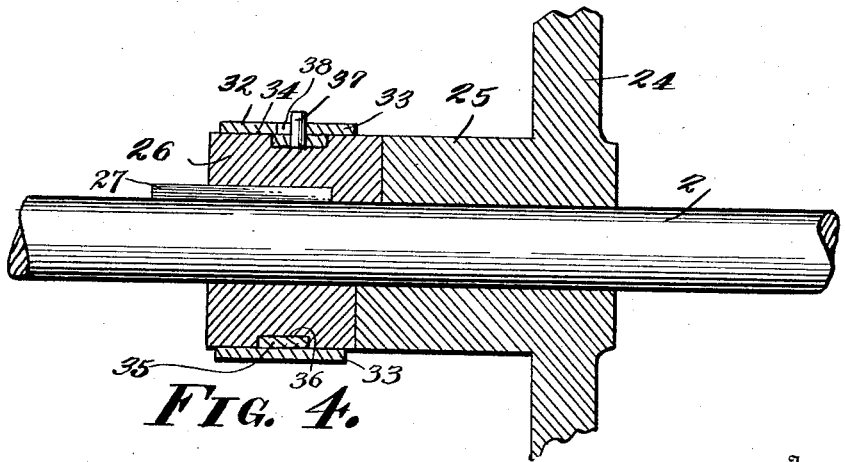

In the drawings:—Figure 1 is a plan view of the improved harvester, showing the chute adjusted as extending to the right side in full lines, and extending to the other side in dotted lines, and also showing the same arranged in a position intermediate the first two positions. Fig. 2 is a view in side elevation. Fig. 3 is an end view partly in section. Fig. 4 is a sectional view on line 4—4 of Fig. 3. Fig. 5 is an enlarged detail view. Fig. 6 is a view showing a diagram in dotted lines, illustrating the method of gathering and depositing beans, peas or the like.

Referring to the drawings, 1 designates the framework, in bearings of which an axle 2 is mounted provided with wheels 5. Also mounted upon the axle is a supplemental frame 6, 9.

The conveyer frame has journaled in its ends the shafts 10 and 11, over the sprockets 13 of which shafts the chains 14 of the conveyer 15 travel. On one end of the shaft 10 is a sprocket 16, about which the chain 17 engages. This sprocket chain 17 also travels about the sprocket 18 of the shaft 19, which is provided with a gear 20, meshing with the gear 21 of the shaft 22 of the pick up mechanism. The pick-up mechanism is in the form of a rotatable member or rake, embodying a roll or cylinder 22ª carrying radially extending teeth 23ª, as shown.

The sprocket chain 17 also travels about the sprocket 24, which is loosely journaled upon the axle 2, and when this sprocket 24 is thrown in clutch with the axle 2, motion will be imparted to the various parts of the pick up mechanism, as well as imparting motion to the elevating conveyer. The sprocket wheel 24 is provided with a clutch member 25, with which the clutch member 26 coöperates, when thrown, to clutch the sprocket wheel to the axle 2. The clutch member 26 is splined as shown at 27 to the axle 2, so as to slide thereon but rotate therewith, there being a spring 28 which acts to hold the clutch members in gear. Pivoted at 30 to a lateral projection 31 of the frame 1 is a lever 32, the central portion of which is constructed with upper and lower bars 33 forming an elliptical opening 34, in which the clutch member 26 is arranged. The clutch member is provided with an annular collar 35 working in a groove 36 of the clutch member 26. This collar is provided with pins 37 engaging the elongated openings 38 of the bars 33. By shifting the lever 32 toward and from the elevating conveyer, the sprocket 24 may be thrown in and out of gear with the axle 2. Pivoted at 39 to the frame 1 is a bell crank lever 40, one arm of which is provided with a slot and pin connection 41 to one end of the lever 32, while to the other arm 42 of the bell crank lever 40 a rod 43 is connected. This rod 43 is in turn pivotally connected at 44 to the downwardly extending crank 45 of a rock shaft 46' turned by the lever 46. To the lower extreme end of the crank 45 a bracket plate 47 is pivotally mounted, and mounted in the bracket plate is a rod 48 having a nut 49. The rod 48 in turn is pivoted at 50 to the arm 51 of the rock shaft 52, which is mounted in bearings of the frame 1. Extending downwardly from the rock shaft 52 adjacent its ends are bifurcated arms 54, which by means of the pins 55 are connected to the lever 56, which are pivoted upon the shaft 22 of the pick up mechanism. By adjusting the pins 55 in the apertures 57 of the levers or arms 56, the said arms 54 may be adjusted relative to the levers or arms 56, or in other words the pick up mechanism may be raised or lowered in adjusted positions relative to the rock shaft 52. The lever 46 is provided with the usual dog 59 and hand grip 60 which is connected to the dog by the rod 61, for holding the lever 46 in adjusted position. By adjusting the lever 46 the pick up mechanism including the conveyer frame and conveyer may be raised and lowered, the axle 2 acting as a fulcrum. At the same time the pick up mechanism and the conveyer are raised and lowered, the clutch member 26 is thrown in and out of clutch with the clutch member 25. The usual forward supporting wheels 63 and supporting members 64 are provided, for supporting the forward end of the frame 1. The dog 59, when the lever 46 is adjusted in the position desired coöperates or engages the teeth of the segment 65. The usual operator's seat is arranged on the frame 1 adjacent the lever 46, as well as adjacent the lever 66, the operator's seat is designated by the character 67. The lever 66 is movable with the rock shaft 68, and is provided with the usual dog 69 and hand grip 70, which is connected to the dog by the rod 71. The rock shaft 68 has an arm 72.

Swiveled upon the bolt 73 of the rear portion of the supplemental frame 6 is a frame 74, the arms of which are secured at 75 to the chute 76, the gate of which is pivoted at 77 and is held normally closed, by the weighted arm 78, until the chute is pretty well loaded, and then the weight of the contents in the chute will over-balance the weight of the arm, and the gate then will fall open, thereby depositing the beans, peas or the like in one or another of the rows as shown in the drawings, the gate being shown as lowered by a load, against the opposition of the weight. In order to assist in tilting the gate open, the lever 46 may be operated or adjusted, so as to raise the conveyer frame at its forward end, and as the conveyer frame rises, the chute and the supplemental frame will lower to increase the angularity of the chute, causing material therein to gravitate toward the lower end thereof, and open the gate. In this manner the gate will be partially assisted in opening. A set screw 79 is provided for holding the weight of the weighted arm in adjusted positions, and by adjusting the weight, the automatic opening of the gate will be adjusted. In other words by adjusting the weight nearer the pivot of the gate, it will take less weight of the contents of the chute to act against the gate so as to open the same and to overbalance the weight of the arm. As before stated, the chute is swivelly mounted, and to adjust the chute the frame 74 is provided with an arm 80, to which a rod 81 is connected, which in turn is connected at 82 to the arm 83 of the bell crank lever 84, the arm 85 of which has connected to it the rod 86. The rod 86 is in turn connected to the arm 72. It will thus be seen that by adjusting the lever 66, the chute may be arranged in order to extend laterally to either side of the machine. To guide the chute as the same is adjusted upon its swivel a band 89 is connected to the supplemental frame 6, and formed semi-circular in contour, and with which the tongue 90 carried by the chute engages, thereby not only guiding the chute as it is moved on its swiveled mounting, but also supporting the chute.

One of the principal objects of the invention is the provision of a machine to windrow of beans, peas or the like, by putting six rows into one, which constitutes a windrow. For instance, starting the machine with the chute extending directly rearwardly down the path $b^2$, gathering the rows $c$ and $d$. The beans are elevated by the conveyer, and then into the chute, which again deposits them in the path $b^2$, owing to the gate being down. In gathering the beans or the like the dirt and stones drop through to the ground, while the beans are carried up to the chute on which they slide to the ground in a path $b^2$ from whence they were gathered. In the meantime the surface of the path $b^2$ has been made smooth by the operation of the cylinder. The machine continues to the end of the path $b^2$, and then is turned and travels down the path $c^2$, the chute having been adjusted to extend substantially to the right as indicated at $c^3$. As the machine passes down the path $c^2$, the rows $e$ and $f$ of beans or the like are gathered by the cylinder, and are carried up by the conveyer, the stones and dirt dropping through to the ground, to the chute as before, and being that the chute has been turned, as indicated at $c^3$, in Fig. 6, the beans or the like are deposited in the path $b^2$, on top of the beans or the like in said path, thereby making four rows in one. Permitting the chute to remain in this latter position, that is, as indicated at $c^3$, the machine then travels the path $a^2$, gathering the rows of beans or the like $a$ and $b$, landing or depositing the beans, peas or the like of rows $a$, and $b$, in the path $b^2$, thereby completing what is termed a windrow containing six rows of beans. By referring to Fig. 6 it will then be seen that the machine starts from the other end of the field going down to the path $e^2$, with the chute directly in the rear, and then down the path $d^2$. In passing down path $d^2$, the chute is adjusted to one side as indicated at $d^3$, and thence the machine passes down the path $f^2$, the chute still remaining as indicated at $f^3$. In passing down the path $e^2$, $d^2$, and $f^2$, the rows $g$, $h$, $i$, $k$ and $l$ of beans are gathered, and when such rows are gathered and deposited in the path $e^2$, operator proceeds to gather the other rows $m$, $n$ and $o$, and so on until an entire field has been operated on, arranging the beans in windrows. However, it will be observed by referring to the drawing, particularly Fig. 1, it will be seen that the chute may be adjusted toward either side of the machine.

In practical fields it may be found necessary to subject the details of construction to alterations, to which the patentee is entitled, provided the alterations fall within the scope of what is claimed.

The invention having been set forth, what is claimed as new and useful is:—

In a machine of the character described, a wheeled frame, an inclined conveyer arranged thereon, a supplemental frame secured to the rear end of the main frame below the conveyer and formed of a curved bar, a vertically inclined chute arranged to receive material from the rear upper end of the inclined conveyer, a transverse bar arranged within and secured to the curved bar, a tripod-frame pivotally mounted upon the transverse bar and rigidly secured to the inclined chute to swing the chute in a horizontal plane, means to swing the tripod-frame in opposite directions, a bracket rigidly secured to the bottom of the chute and slidable upon the curved bar, and a door hinged to the lower end of the chute to open and close the same.

In testimony whereof I have signed my name to this specification in the presence of two subscribing witnesses.

SAMUEL ROOSA.

Witnesses:
 CHAS. TAPHOUSE,
 W. O. PHILLIPS.

Copies of this patent may be obtained for five cents each, by addressing the "Commissioner of Patents, Washington, D. C."